(12) United States Patent
Asano et al.

(10) Patent No.: US 7,448,253 B2
(45) Date of Patent: Nov. 11, 2008

(54) COMBUSTION STATE DETERMINATION METHOD OF INTERNAL COMBUSTION ENGINE

(75) Inventors: Morita Asano, Ikeda (JP); Mitsuhiro Izumi, Osaka (JP); Tsutomu Kusuhara, Osaka (JP)

(73) Assignees: Daihatsu Motor Co., Ltd. (JP); Diamond Electric Mfg. Co., Ltd. (JP)

(*) Notice: Subject to any disclaimer, the term of this patent is extended or adjusted under 35 U.S.C. 154(b) by 63 days.

(21) Appl. No.: 11/659,663

(22) PCT Filed: Aug. 3, 2005

(86) PCT No.: PCT/JP2005/014221

§ 371 (c)(1),
(2), (4) Date: Feb. 7, 2007

(87) PCT Pub. No.: WO2006/018975

PCT Pub. Date: Feb. 23, 2006

(65) Prior Publication Data

US 2008/0028842 A1 Feb. 7, 2008

(30) Foreign Application Priority Data

Aug. 20, 2004 (JP) ............................. 2004-240996

(51) Int. Cl.
*G01M 15/00* (2006.01)
(52) U.S. Cl. .................................. 73/35.08; 73/114.08
(58) Field of Classification Search ................ 73/35.01, 73/35.03, 35.06, 35.07, 35.08, 114.02, 114.08, 73/114.67
See application file for complete search history.

(56) References Cited

U.S. PATENT DOCUMENTS

| 6,196,054 B1 * | 3/2001 | Okamura et al. ........... 73/35.08 |
| 6,213,092 B1 | 4/2001 | Hohner et al. |
| 6,343,500 B1 * | 2/2002 | Katogi et al. .............. 73/35.08 |
| 6,614,230 B2 * | 9/2003 | Raichle et al. .............. 324/399 |
| 2001/0017055 A1 * | 8/2001 | Raichle et al. ................. 73/116 |
| 2002/0021120 A1 | 2/2002 | Raichli et al. |

(Continued)

FOREIGN PATENT DOCUMENTS

JP 06-034491 2/1994

(Continued)

*Primary Examiner*—Eric S McCall
(74) *Attorney, Agent, or Firm*—Banner & Witcoff, Ltd.

(57) ABSTRACT

The present invention is a combustion state determination method of an internal combustion engine for detecting an ion current which is generated in a combustion chamber at combustion of the internal combustion engine in a detection period to determine a combustion state, comprising steps of detecting a primary combustion period on the basis of a first ion current which forms the detected ion current and occurs immediately after ignition, detecting a secondary combustion period on the basis of the ion current which occurs after disappearance of the first ion current when at least the detected primary combustion period is normal, determining the combustion state on the basis of the detected primary combustion period when the secondary combustion period is smaller than a predetermined value, and determining the combustion state on the basis of a whole combustion period from start of the detection period of the ion current to end of the last secondary combustion period in the detection period when the secondary combustion period is larger than the predetermined value.

6 Claims, 4 Drawing Sheets

U.S. PATENT DOCUMENTS

2003/0097870 A1* 5/2003 Honda .................... 73/35.08
2007/0266772 A1* 11/2007 Kawakami et al. ......... 73/35.16

FOREIGN PATENT DOCUMENTS

| | | |
|---|---|---|
| JP | 10-176595 | 6/1998 |
| JP | 10-274091 A | 10/1998 |
| JP | 3193620 B2 | 5/2001 |
| JP | 2001-280194 A | 10/2001 |
| JP | 2004-232568 | 8/2004 |

* cited by examiner

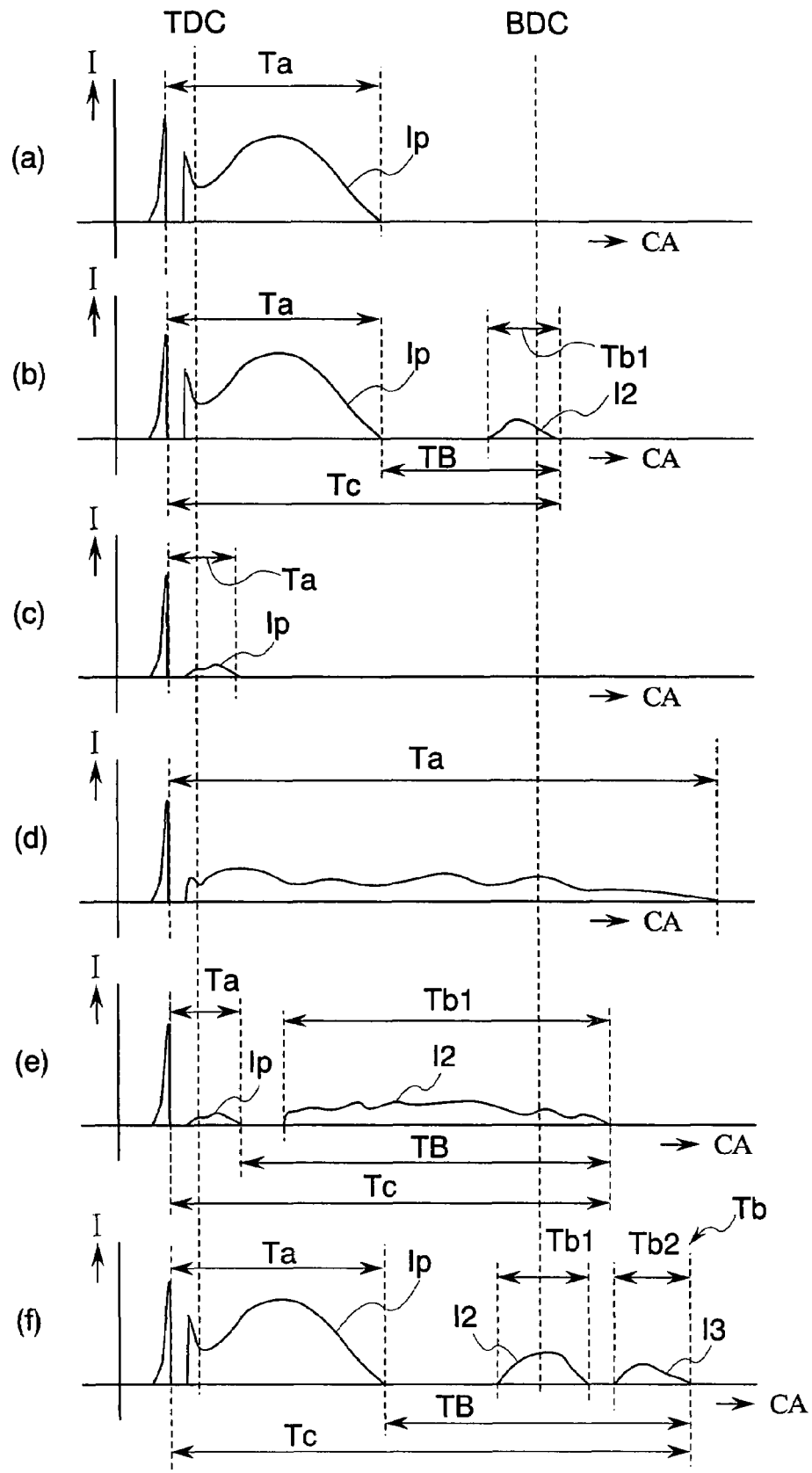

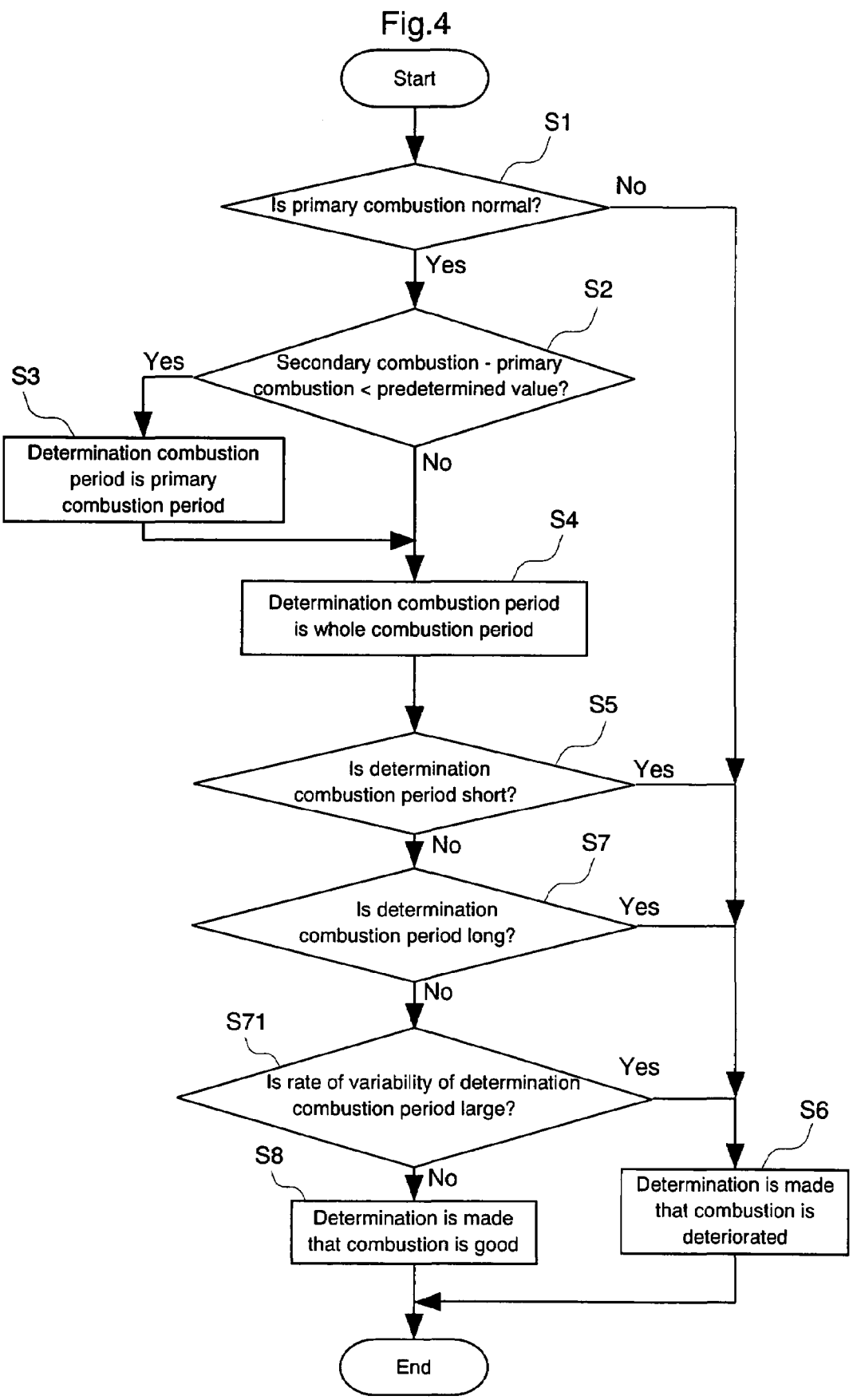

COMBUSTION STATE DETERMINATION METHOD OF INTERNAL COMBUSTION ENGINE

This application is a national stage application of co-pending PCT application PCT/JP2005/014221 filed Aug. 3, 2005, which was published in Japanese under PCT Article 21(2) on Feb. 23, 2006, which claims the benefit of Japanese non-provisional application serial number 2004-240996 filed, Aug. 20, 2004, the disclosure of which is expressly incorporated herein.

TECHNICAL FIELD

The present invention relates to a method for determining combustion state using an ion current in an internal combustion engine mounted in vehicles and the like.

BACKGROUND ART

Conventionally, in a spark ignition type internal combustion engine, by generating an ion current in a combustion chamber using a spark plug immediately after start of combustion and measuring a generation period of the ion current, the combustion state is determined. For example, Patent document 1 describes a method for measuring characteristics of the ion current from a total time of periods each during which the ion current is larger than a predetermined value or an ion current generation period of the period from ignition to a final point at which the ion current is larger than the predetermined value to detect the combustion state.

Patent document 2 describes a method for setting an ion current determination timing on the basis of a position where the ion current disappears in normal combustion and measuring combustion time on the basis of ion current detection time up to the timing.

Patent document 1: Unexamined Patent Publication No. 6-34491

Patent document 2: Unexamined Patent Publication No. 10-176595

DISCLOSURE OF THE INVENTION

Problem to be Solved by the Invention

In both the methods described in Patent document 1 and Patent document 2, only the ion current caused by primary combustion having the highest combustion pressure since ignition is noted and the ion current caused by combustion following the primary combustion is not considered. That is, although the characteristic of ion current or the ion current detection time is detected, only a part of the ion current caused by combustion is used.

According to such a method of using the ion current, there are cases where the combustion state when being deteriorated cannot be determined. That is, for example, in the case where the combustion state is deteriorated and generation state of the ion current changes, for example, the ion current occurs due to primary combustion and disappears in a relatively short time and then, the ion current occurs in the exhaust stroke again, the regenerated ion current is not considered.

Accordingly, when the combustion state is deteriorated, merely by detecting the combustion state on the basis of the characteristics of ion current corresponding to primary combustion, deterioration of the combustion state is not necessarily determined. Thus, with the above-mentioned configuration, it is difficult to determine the combustion state with high accuracy.

The present invention intends to solve such problems.

Means for Solving Problem

That is, a combustion state determination method of an internal combustion engine according to the present invention is a method for detecting an ion current which is generated in a combustion chamber at combustion of the internal combustion engine in a detection period to determine a combustion state, comprising steps of detecting a primary combustion period on the basis of a first ion current which forms the detected ion current and occurs immediately after ignition, detecting a secondary combustion period on the basis of the ion current which occurs after disappearance of the first ion current when at least the detected primary combustion period is normal, determining the combustion state on the basis of the detected primary combustion period when the secondary combustion period is smaller than a predetermined value, and determining the combustion state on the basis of a whole combustion period from start of the detection period of the ion current to end of the last secondary combustion period in the detection period when the secondary combustion period is larger than the predetermined value.

As described above, according to the present invention, when the primary combustion period detected based on the ion current generated immediately after ignition, by detecting the secondary combustion period on the basis of the ion current generated following the first ion current, the combustion state is determined by the primary combustion period or the whole combustion period depending on magnitude relationship between the secondary combustion period and the predetermined value. Therefore, by using the ion current generated following the first ion current, which has not been used conventionally, even when the first ion current corresponds to good (normal) combustion, the combustion state in which the ion current intermittently occurs, for example, ignition timing is largely retarded. Thus, the case where combustion is shifted to the exhaust stroke in comparison with the case of normal combustion can be determined.

For example, when combustion is shifted to the exhaust stroke side by retarding ignition timing to rise the temperature of a catalyst attached to the exhaust system earlier, the ion current intermittently occurs after disappearance of the first ion current and thus combustion is long, to improve determination accuracy, it is preferred that the secondary combustion period is the sum of a plurality of secondary combustion periods.

For example, when the internal combustion engine is operated according to lean burn control with high air-fuel ratio, to easily detect the slow combustion state, it is preferred that the secondary combustion period is a period from end of the primary combustion period to complete disappearance of the ion current in the ion current detection period.

With the above-mentioned configuration, it is preferred that a determination upper limit and a determination lower limit are set and when the detected primary combustion period falls within a range defined by the determination lower limit and the determination upper limit, the detected primary combustion period is determined as normal.

The combustion state may be determined based on length of the determination combustion period or the rate of variability of the determination combustion period.

Effect of the Invention

With the above-mentioned configuration of the present invention, when at least the primary combustion period is normal, the combustion state is determined by one of the primary combustion period and the whole combustion period depending on magnitude relationship between the secondary combustion period and the predetermined value. Therefore, by using the ion current generated following the first ion current, which has not been used conventionally, even when the first ion current corresponds to good (normal) combustion, the combustion state in which the ion current intermittently occurs, for example, ignition timing is largely retarded. Thus, the case where combustion is shifted to the exhaust stroke in comparison with the case of normal combustion can be determined. As described above, even when the primary combustion period is normal, in the case where combustion varies on the exhaust stroke side, for example, by retarding the ignition timing, the combustion state can be determined and thus, accuracy of determining whether combustion is good or not can be improved.

BRIEF DESCRIPTION OF DRAWINGS

FIG. 3 is a graph showing current waveforms of ion currents in accordance with the embodiment.

FIG. 4 is a flow chart showing control procedure in accordance with another embodiment of the present invention.

BEST MODE FOR CARRYING OUT THE INVENTION

Hereinafter, an embodiment of the present invention will be described with reference to drawings.

Figure 1:
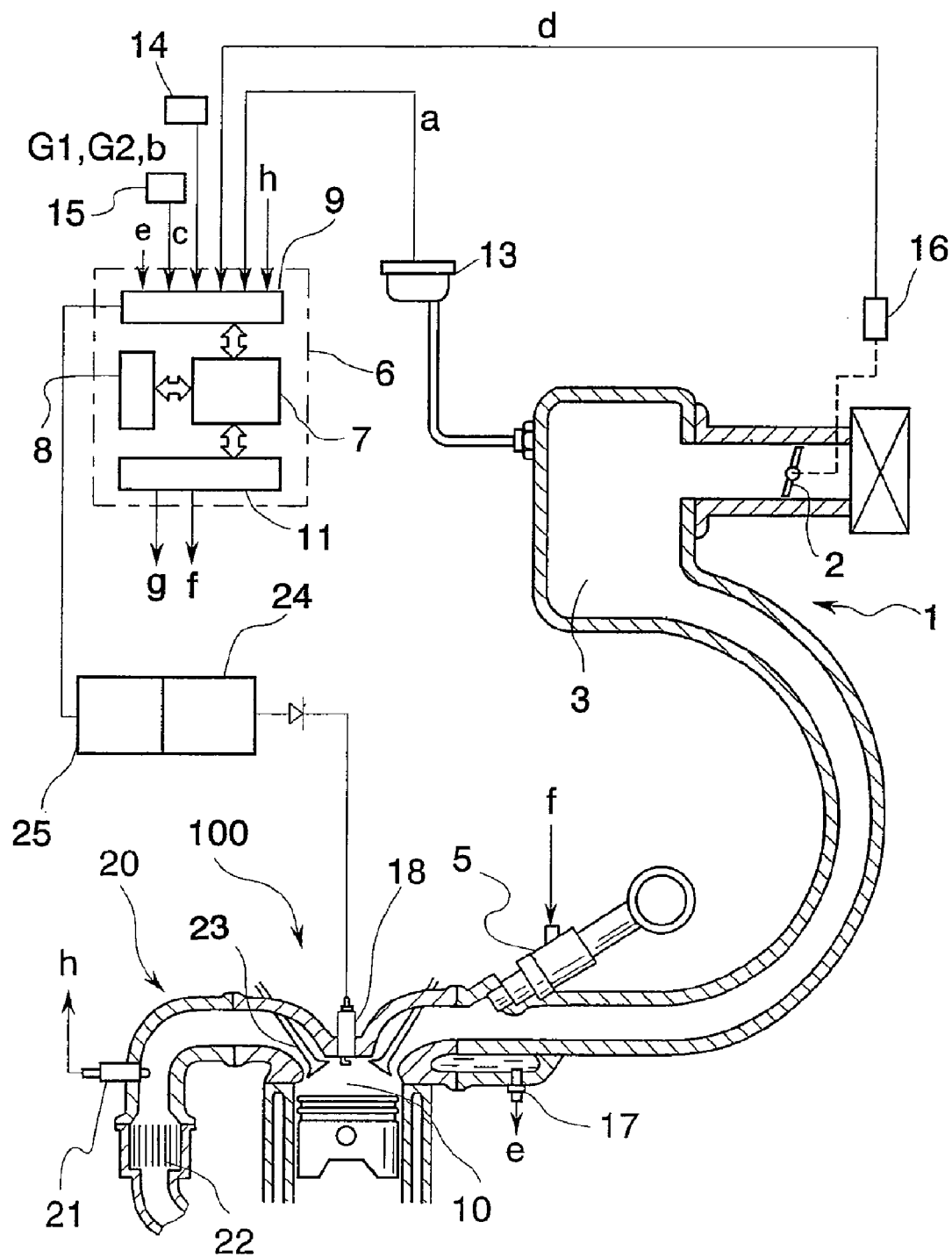
FIG. 1 is an explanation view showing a schematic configuration of an engine and an electronic control device in accordance with an embodiment of the present invention.

An engine 100 schematically shown in FIG. 1 is used for automobiles. In the engine 100, a throttle valve 2 which opens/closes in response to an accelerator pedal not shown is disposed and a surge tank 3 is provided downstream of the throttle valve 2 in an intake system 1. A fuel injection valve 5 is provided in the vicinity of one end of the intake system 1 communicating to the surge tank 3. Opening of the fuel injection valve 5 is controlled by an electronic control device 6 on the basis of basic injection quantity described later. A spark plug 18 is attached at a position corresponding to a ceiling of a combustion chamber 10. The combustion chamber 10 selectively communicates to an exhaust system 20 through an exhaust valve 23. In the exhaust system 20, an $O_2$ sensor 21 for measuring oxygen concentration of exhaust gas is attached at a position upstream of a catalyst 22 placed in a duct extending to a muffler not shown.

The electronic control device 6 is mainly composed of a microcomputer system having a CPU (central processing unit) 7, a memory 8, an input interface 9 and an output interface 11. An intake port pressure signal a output from an intake port pressure sensor 13 for detecting pressure in the surge tank 3, a cylinder determination signal G1, a crank angle reference position signal G2 and an engine speed signal b which are output from a cam position sensor 14 for detecting rotation state of the engine 100, a vehicle speed signal c output from a vehicle speed sensor 15 for detecting vehicle speed, an LL signal d output from an idle switch 16 for detecting open/close state of the throttle valve 2, a water temperature signal e output from a water temperature sensor 17 for detecting cooling water temperature of the engine and a current signal h output from the O2 sensor 21 are input to the input interface 9. On the other hand, the output interface 11 outputs a fuel injection signal f to the fuel injection valve 5 and an ignition pulse g to the spark plug 18.

A bias power supply 24 and an ion current measurement circuit 25 for measuring ion current are connected to the spark plug 18. Various circuits which are known in the related art may be used as the ion current measurement circuit 25 itself containing the bias power supply 24. After ignition, the bias power supply 24 applies voltage to the spark plug 18 so as to pass the ion current into the combustion chamber 10. The ion current measurement circuit 25 is electrically connected to the input interface 9 of the electronic control device 6, measures the ion current generated by application of voltage in an analog manner and inputs an analog signal corresponding to the generated ion current to the electronic control device 6.

The electronic control device 6 stores a program for correcting basic injection time according to various correction coefficients determined depending on an engine state on the basis of the intake port pressure signal a output from the intake port pressure sensor 13 and the engine speed signal b output from the cam position sensor 14 to obtain valid injection time, determining fuel injection valve opening time, that is, injector final conducting time on the basis of the valid injection time, controlling the fuel injection valve 5 by the determined conducting time and injecting fuel corresponding engine load from the fuel injection valve 5 of the intake system 1 therein.

The electronic control device 6 also stores a program for controlling operation of the engine 100 and detecting the ion current passing into the combustion chamber 10 each ignition to determine the combustion state, more particular, a program for detecting a primary combustion period on the basis of a first ion current generated immediately after ignition forming the detected ion current, detecting a secondary combustion period on the basis of the ion current occurring after disappearance of the first ion current when at least the primary combustion period is normal, determining the combustion state on the basis of the detected primary combustion period when the secondary combustion period is smaller than a predetermined value and determining the combustion state on the basis of a whole combustion period from start of the ion current detection period to end of the final secondary combustion period in the detection period when the secondary combustion period is larger than the predetermined value therein.

Figure 2:
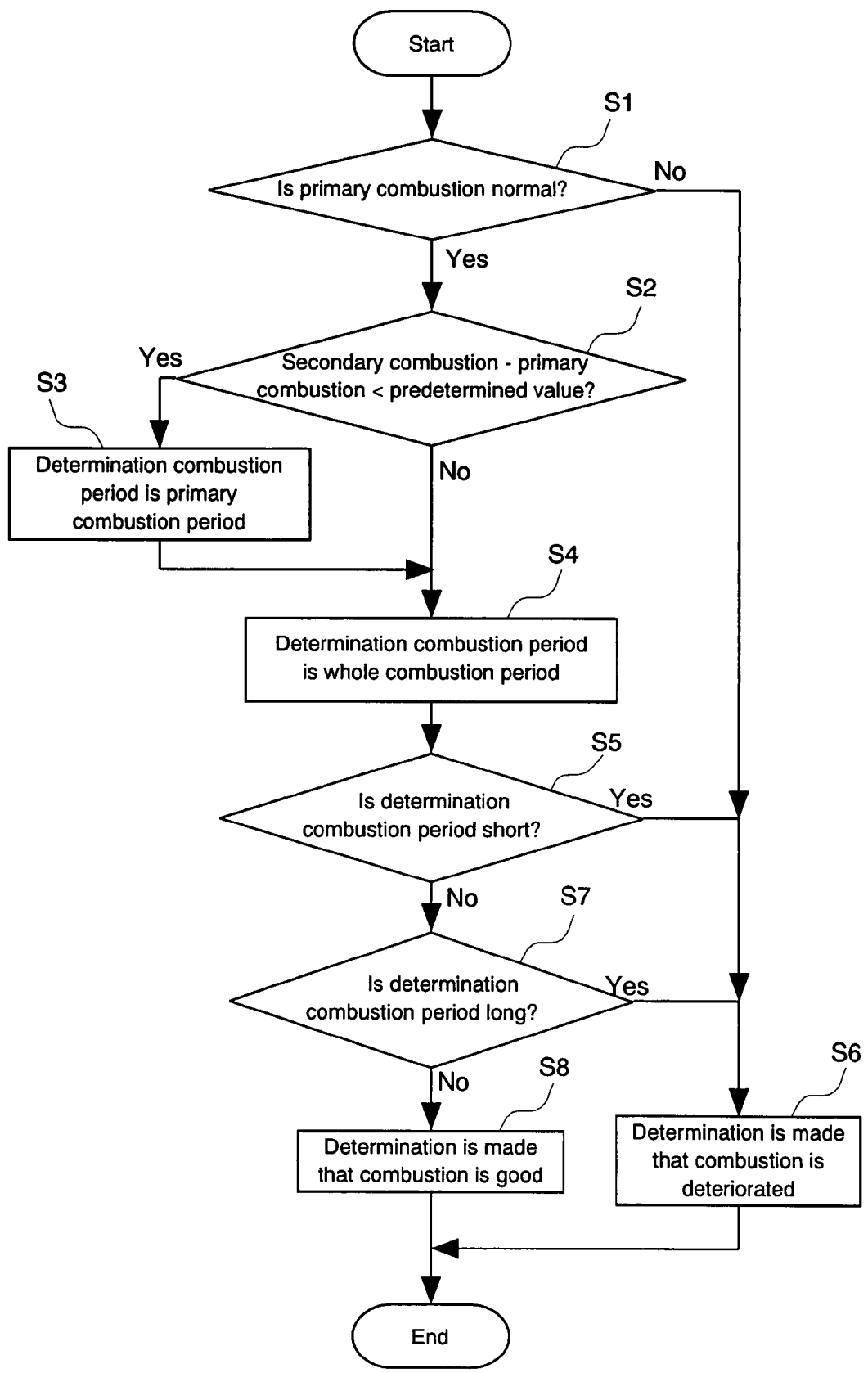
FIG. 2 is a flow chart showing control procedure in accordance with the embodiment.

FIG. 2 schematically shows the combustion state detection program based on the ion current.

Magnitude and generation period of the ion current vary depending on the combustion state of air-fuel mixture. In this embodiment, using a period from start of ignition until a crank angle of 360 degrees has reached as the ion current detection period, the ion current generating period in the current detection period is measured on a crank angle basis.

The ion current presents various ways to pass, that is, waveforms depending on the combustion state. The current waveform reflects the combustion state. FIG. 3 shows classified waveforms of the ion current.

First, FIG. 3(a) shows the ion current waveform detected when the combustion state is good. The ion current waveform rapidly changes immediately after ignition, then, becomes maximum in the vicinity of a top dead center in an expansion stroke, that is, a piston position where combustion pressure becomes maximum and then, decreases with lowering of the piston. In this case, as a result, only a primary combustion period Ta is detected from the ion current waveform. Hereinafter, the ion current first generated after ignition is referred to as a first ion current Ip and the ion current newly generated after disappearance of the first ion current Ip is referred to as a second ion current I2. Similarly, the ion current is sequentially referred to as an n-th ion current In (n is an integer). The ion current waveform shown in FIG. 3(a) is the case where n-th ion current In does not occur.

There are cases where the second ion current I2 continues in a discontinuous manner following the first ion current Ip. Specifically, by opening the exhaust valve 23, combustion gas moves through the exhaust system and accordingly, flow rate of the combustion gas changes and the second ion current I2 occurs after the first ion current Ip. When the combustion state is good, as shown in FIG. 3(b), generation period of waveform of the second ion current I2 is relatively short and magnitude (current value) of the second ion current I2 is smaller than that of the first ion current Ip.

On the contrary, FIG. 3(c) shows waveform of the ion current corresponding to the combustion state such as a misfire. Although the ion current (in this case, the first ion current Ip) passes, the current value is small and the generation period of the ion current waveform is much shorter than that in the other combustion states. On the other hand, in the case where the air-fuel mixture is lean, that is, the air-fuel ratio is high and the combustion state is deteriorated, as shown in FIG. 3(d), waveform of the first ion current Ip does not become large even when the combustion pressure becomes maximum. The waveform extends as the substantially same current value is maintained and continues up to or beyond the end of the ion current detection period.

In a similar manner, when the combustion state is deteriorated, waveform obtained by combining the ion current waveform shown in FIG. 3(c) with the ion current waveform shown in FIG. 3(d) maybe generated. In other words, since combustion itself is not good in spite of ignition, the first ion current Ip is small and the second ion current I2 is generated in the latter half of the combustion period for a relatively long time.

As distinct from the above-mentioned case where the generated ion current characteristically appears according to the combustion state, the ion current secondarily occurs plural times depending on the combustion state. Specifically, as shown in FIG. 3(f), for example, after the first ion current Ip disappears once, the second ion current I2, a third ion current I3, a fourth ion current (not shown) . . . occur with a distance therebetween.

For the ion current presenting such behavior, the primary combustion period Ta and the secondary combustion period Tb are measured based on the generation time (period) of the first ion current Ip and the n-th ion current In on a crank angle basis. The whole combustion period Tc corresponding to elapsed time (period) from start of measurement of the ion current, that is, immediately after ignition to disappearance of the last n-th ion current in the ion current detection period is also measured on a crank angle basis.

Detection (measurement) of the ion current is performed in each cylinder at each ignition. After ignition, bias voltage is applied to the spark plug 18 from the bias power supply 24 and the ion current thus generated in the combustion chamber 10 through the spark plug 18 is detected (measured) by the ion current measurement circuit 25. The ion current measurement circuit 25 outputs an ion current signal corresponding to the current value of the ion current to the electronic control device 6. In response to the input ion current signal, the electronic control device 6 measures the primary combustion period Ta on the basis of the first ion current Ip, the secondary combustion period Tb on the basis of the n-th ion current In and the whole combustion period Tc. In this case, for example, even when only the first ion current Ip occurs as shown in FIGS. 3(a), (c) and (d), the ion current signal is monitored until the ion current detection period is finished and the secondary combustion period Tb is measured on the basis of the n-th ion current In. As described above, when no n-th ion current In occurs, the secondary combustion period Tb is 0° CA.

The measured primary combustion period Ta, the secondary combustion period Tb and the whole combustion period Tc are temporarily stored in the memory 8 of the electronic control device 6 and is used for calculation for determining the combustion state.

The combustion state is determined based on magnitude relationship among the primary combustion period Ta, the secondary combustion period Tb and the whole combustion period Tc.

Specifically, in the ion current detection period set up to 360° CA (crank angle) from ignition, the ion current is detected. In the ion current detection period, as described above, in response to the ion current signal, the primary combustion period Ta is measured based on waveform of the first ion current Ip (or the generation period of the first ion current Ip), the secondary combustion period Tb is measured based on waveform of the n-th ion current In and the whole combustion period Tc is measured based on the crank angle corresponding to the ignition time and the crank angle at which waveform of the last n-th ion current In disappears.

Specifically,, the ion current output from the ion current measurement circuit 25 through the spark plug 18 is compared with reference level set so as to detect the ion current and the angle at which the current value of the ion current which is at the reference level or higher is generated is measured in the ion current detection period to detect the ion current. In this case, the crank angle reference position signal G2 output from the cam position sensor 14 is calculated from the point where the ion current reaches the reference level or higher, calculation of the crank angle reference position signal G2 is stopped at the point where the ion current falls below the reference level and the primary combustion period Ta, the secondary combustion period Tb and the whole combustion period Tc are measured. The primary combustion period Ta, the secondary combustion period Tb and the whole combustion period Tc which are measured are temporarily stored in the memory 8.

After detection of the ion current is finished, at a step S1, it is determined whether or not the primary combustion period Ta is normal. To determine the primary combustion period Ta, a determination lower limit and a determination upper limit are set. When the measured the primary combustion period Ta falls between the determination lower limit and the determination upper limit, that is, a predetermined range, the primary combustion period Ta is determined as normal. For example, the determination lower limit is set as a value of the crank angle of 10° CA from the top dead center and the determination upper limit is set as a value of the crank angle of 190° CA from the top dead center. When the measured primary combustion period Ta is the determination lower limit or less, that is, when the measured primary combustion period Ta is extremely short although the first ion current Ip occurs, or conversely, when the measured primary combustion period Ta is the determination upper limit or more and is extremely long, the primary combustion period Ta is determined as abnormal and the procedure proceeds to a step S6.

Next, at a step S2, the primary combustion period Ta is substracted from the secondary combustion period Tb and it is determined whether or not the difference is below a predetermined value, that is, the secondary combustion period Tb is below the value obtained by adding the primary combustion period Ta to the predetermined value. The predetermined value is set as, for example, 150° CA (crank angle) obtained by adding an angle at which the exhaust valve 23 is initially opened to a margin. In this case, when the ion current having the waveform shown in FIGS. 3(a) and (c) is detected, the secondary combustion period Tb is 0° CA and when the ion current having the waveform shown in FIG. 3(f) is detected, the secondary combustion period Tb becomes the sum or integration of the combustion periods corresponding to the second ion current I2 and the third ion current I3, that is, the sum of a secondary combustion period Tb1 and a secondary combustion period Tb2. When the difference is below the predetermined value, that is, the primary combustion period Ta is shorter than or substantially same as the secondary combustion period Tb, the procedure proceeds to the step S3, and when the difference is the predetermined value or more, the procedure proceeds to a step S4.

At the step S3, the primary combustion period Ta is set as a determination combustion period for determining the combustion state. At the step S4, the whole combustion period Tc is set as a determination combustion period for determining the combustion state.

At a step S5, it is determined whether or not the determination combustion period is short and when the determination combustion period is short, the procedure proceeds to a step S6. When the determination combustion period is not short, the procedure proceeds to a step S7. At the step S5, determination is made that the determination combustion period is short when the determination combustion period exceeds the top dead center TDC and the crank angle reaches, for example, 10° CA.

At the step S6, since the determination combustion period is short, determination is made that combustion is deteriorated. At the step S5 prior to the step S6, although the determination combustion period varies according to the determination at the step S2, when both the primary combustion period Ta and the whole combustion period Tc are short, determination is made that combustion is deteriorated.

At the step S7, it is determined whether or not the determination combustion period is long. When the determination combustion period is long, the procedure proceeds to a step S6 and when the determination combustion period is not long, the procedure proceeds to a step S8. At the step S7, determination is made that the determination combustion period is long when the determination combustion period exceeds the top dead center TDC and the crank angle exceeds, for example, 190° CA. At the step S8, determination is made that combustion is good.

With such a configuration, when the ion current shown in FIG. 3 is detected, relationship between the ion current and the combustion state will be described.

First, a first example will be described. The first example shows the case of the ion current shown in FIG. 3(a). In this case, only the first ion current Ip is detected and the first ion current Ip exceeds the top dead center TDC and continues to the crank angle located at an intermediate position between the top dead center TDC and the bottom dead center BDC. Since the primary combustion period Ta based on the first ion current Ip falls in the range between the above-mentioned determination lower limit and determination upper limit, the ion current is determined as normal at the step S1 and the procedure proceeds to the step S2. In the first example, the secondary combustion period Tb measured based on the n-th ion current In becomes 0° CA.

Thus, since the secondary combustion period Tb is smaller than the value obtained by adding the primary combustion period Ta to the predetermined value, "Yes" is determined at the step S2 and the primary combustion period Ta is set as the determination combustion period at the step S3. As apparent from FIG. 3(a), the primary combustion period Ta does not satisfy each of the determination standards for the determination combustion period defined at the step S5 and the step S7. That is, the determination combustion period in this case exceeds the top dead center TDC and the position at which the crank angle becomes 10° CA and finishes until the crank angle reaches 190° CA. Accordingly, the control operation for determining the combustion state proceeds to the step S1, the step S2, the step S3, the step S5 and the step S7 in this order. At the step S8, determination is made that combustion is good.

Similarly, a second example shows the case of the ion current shown in FIG. 3(b). The detected ion current is composed of the first ion current Ip and the second ion current I2. The generation period of the first ion current Ip is the same as that in the above-mentioned first example and the generation period of the second ion current I2 is short. Thus, the secondary combustion period Tb1 is short. Consequently, the difference between the secondary combustion period Tb1 and the primary combustion period Ta falls below the predetermined value and the primary combustion period Ta becomes the determination combustion period. As a result, also in the second example, the control operation for determining the combustion state proceeds to the step S1, the step S2, the step S3, the step S5 and the step S7 in this order. At the step S8, determination is made that combustion is good.

Next, a third example will be described using the ion current shown in FIG. 3(c). The ion current shown in FIG. 3(c) is composed of only the first ion current Ip. The ion current exceeds the top dead center TDC and disappears until the crank angle of 10° CA. The n-th ion current In does not occur. Thus, at the step S1, determination is made that the primary combustion period Ta is abnormal. The procedure proceeds to the step S6 and determination is made that combustion is poor.

A fourth example will be described using the ion current shown in FIG. 3(d). In the fourth example, the ion current is composed of only the first ion current Ip. However, as distinct from the case in the third example, the ion current exceeds the top dead center TDC and reaches the crank angle more than 190° CA. That is, n-th current Ip does not occur and only the first ion current Ip is generated for an extremely long period. Thus, as in the third example, determination is that the ion current is abnormal at the step S1 and combustion is deteriorated at the step S6.

In a fifth example, as shown in FIG. 3(e), the ion current is composed of the first ion current Ip and the second ion current I2 and the second ion current I2 occurs for a longer time than the first ion current Ip. Also in this example, the primary combustion period Ta based on the first ion current Ip is short as in the third example and determined as abnormal. Accordingly, following the step S1, the procedure proceeds to the step S6 and determination is made that combustion is deteriorated.

As described above, in spite of presence or absence of the second ion current I2, when the primary combustion period Ta is too short or too long, that is, the primary combustion period Ta does not fall within the range between the determination lower limit and the determination upper limit, determination is made that the primary combustion period Ta is abnormal and the combustion state is determined. Thus, the above-mentioned step S2 to step S8 (except for the step S6) need not be performed. Therefore, the process necessary of determining the combustion state can be simplified and time required for determination can be shortened.

As described above, the ion current may be composed of the first ion current Ip and the second ion current I2. However, there are cases where the first ion current Ip which is similar to the ion current appearing in good combustion occurs and disappears and then, generally speaking, the n-th ion current In intermittently occurs multiple times. As an example, the case where the third ion current I3 occurs following the second ion current I2 as shown in FIG. 3(f) will be described.

In this sixth example, the primary combustion period Ta is measured based on the first ion current Ip, and the secondary combustion periods Tb1, Tb2 are measured based on the second ion current I2 and the third ion current I3. The sum of secondary combustion periods Tb1, Tb2 is regarded as the secondary combustion period Tb for the determination combustion period. After measuring the primary combustion period Ta and the secondary combustion period Tb in this manner and determining whether or not the primary combustion period Ta is normal (step S1), when the difference between the secondary combustion period Tb and the primary combustion period Ta is below the predetermined value ("Yes" at the step S2), the primary combustion period Ta is set as the determination combustion period (step S3). That is, in the combustion state where the second and third ion currents I2, I3 occur following the first ion current Ip, but the secondary combustion period Tb obtained by summing the ion currents I2, I3 is short, such a result is obtained. In the sixth example, since the primary combustion period Ta is the same as the primary combustion period Ta in the good combustion state, the procedure proceeds to the step S5 and then, the step 7 and determination is made that combustion is good at the step S8.

When a plurality of n-th ion currents In occur as in the sixth example, the generation period of the first ion current Ip, that is, the primary combustion period Ta is normal but short and a lot of n-th ion current In occur. Thus, the secondary combustion period Tb becomes long, the secondary combustion period Tb may exceed the value obtained by adding the primary combustion period Ta to the predetermined value ("No" at the step S2). In such case, since the whole combustion period Tc is set as the determination combustion period, the whole combustion period Tc becomes long ("Yes" at the step S7) and determination is made that combustion is deteriorated at the step S8.

As described above, when the load of the engine 100 is low and combustion becomes slow or when combustion is shifted (transferred) to the exhaust stroke side by largely retarding ignition timing to rise the temperature of the catalyst 22 earlier, by detecting the n-th ion current In other than the first ion current Ip corresponding to primary combustion immediately after ignition, variations in the current values (variation in waveform) including the state of combustion other than primary combustion is detected through the whole period up to final disappearance of the ion current to determine the combustion state. Thus, in comparison with the case where the first ion current Ip is detected and the combustion state is determined based on the state of the first ion current Ip, that is, the combustion state is determined on the basis of primary combustion, due to basis for decisions (information for decisions) about the other combustion, deterioration of combustion can be determined with high accuracy.

Furthermore, for example, when the ignition timing is largely retarded, since the combustion state is determined not only based on length of the secondary combustion period Tb on the basis of the n-th ion current In other than the first ion current Ip but length of the whole combustion period Tc. In such a case that the ignition timing is retarded, it is possible to know a limit capable of combusting stably.

The present invention is not limited to the above-mentioned embodiment.

In the above-mentioned embodiment, whether the combustion state is good or not is determined on the basis of length of the determination combustion period. However, when the determination combustion period is not short nor long, the combustion state may be determined based on magnitude of a rate of variability of the determination combustion period. That is, as shown in FIG. 4, a step S71 is introduced after the step S7 in the above-mentioned embodiment, and when the rate of variability of the determination combustion period is above a preset reference, determination is made that combustion is deteriorated at the step S6 and when the rate of variability is below the reference, the procedure proceeds to the step S8 determination is made that combustion is good.

The rate of variability of the determination combustion period is calculated by moving average of the determination combustion period and a deviation based on a difference between the moving average and the determination combustion period. Specifically, the moving average of the determination combustion period is calculated from the determination combustion period set this time and determination combustion periods set previously, for example, 7 determination combustion periods, the deviation is calculated by dividing an absolute value of the difference between the moving average and this determination combustion period by the number of the determination combustion period (8 in this example) in calculating the moving average and the rate of variability is calculated by dividing the deviation by the moving average.

A reference for determining magnitude of variation is set as, for example, 50%, based on the rate of variability of the determination combustion period thus obtained. At the step S71, when the rate of variability is 50% or higher, the rate of variability is determined as large and when the rate of variability is lower than 50%, the rate of variability is determined as small. In such method for determining the combustion state in consideration with the rate of variability, the period from the end of the primary combustion period to the end of the secondary combustion period Tbn corresponding the last n-th ion current In in the ion current detection period is the secondary combustion period TB (FIGS. 3(b), (e) and (f)).

Specifically, in FIGS. 3(b), (e) and (f), measurement for measuring the secondary combustion period TB is started from the point when the first ion current Ip disappears and finished at the point when the n-th ion current In (the third ion current I3 in FIG. 3(f)) generated finally in the ion current detection period disappears. Accordingly, the period during which the ion current disappears until occurrence of the second ion current I2 as well as the period during which the ion current disappears between the second ion current I2 and the third ion current I3 are used as the secondary combustion period TB.

For example, in lean burn control (lean combustion control) controlling fuel by making an air-fuel ratio higher than a stoichiometric air-fuel ratio, when an amount supplied of the fuel is decreased, as closer to the critical combustion state capable of maintaining stable combustion state, the combustion state becomes slower. When the combustion state becomes slow, the generation period of the first ion current Ip, that is, primary combustion period Ta becomes long or short and the number and length of the n-th ion current In are varied. Length of the secondary combustion period TB is also varied.

Accordingly, for example, the primary combustion period Ta, the secondary combustion period TB and the whole combustion period Tc are measured on the basis of the ion current detected in the ion current detection period and then, when the primary combustion period Ta is normal ("Yes" at the step S1), the secondary combustion period TB is above the value obtained by adding the predetermined value to the primary combustion period Ta at this time ("Yes" at the step S2) and the whole combustion period Tc is set as the determination combustion period (step S4). Then, when determination is made that the set determination combustion period is not short ("No" at the step S5) nor long ("No" at the step S7), the combustion state is not determined only whether or not length of the determination combustion period satisfies such predetermined conditions. Whether combustion is good or not (step S6, step S8) is determined by magnitude of the rate of variability (step S71).

Consequently, when the primary combustion period Ta is normal, the secondary combustion period TB and the whole combustion period Tc become long or short at each detection of the ion current in spite that the primary combustion period Ta, combustion approach the limit and it can be determined whether the combustion state is good or not. By determining the rate of variability of the determination combustion period in this manner, determination accuracy of the combustion state can be further improved.

In the above-mentioned embodiment, only when the primary combustion period Ta is normal, the combustion state is determined using the secondary combustion period. However, the secondary combustion period may be used without detecting whether the primary combustion period Ta is normal or abnormal.

In the above-mentioned embodiment, start of ignition is defined as start of the ion current detection period. However, the top dead center in the expansion stroke after ignition may be set as start of the ion current detection period.

Specific configurations of each of the other components are limited to the above-mentioned embodiment and can be variously modified without deviating from the scope of the present invention.

INDUSTRIAL APPLICABILITY

The present invention can be widely applied to a spark ignition-type internal combustion engine mounted in vehicles such as automobiles in which the ion current is generated using the spark plug immediately after start of combustion. In such internal combustion engine, since the combustion state can be determined with high accuracy even when the combustion state is deteriorated, fuel injection and ignition timing can be favorably controlled according to the determined combustion state.

The invention claimed is:

1. A combustion state determination method of an internal combustion engine for detecting an ion current which is generated in a combustion-chamber at combustion of the internal combustion engine in a detection period to determine a combustion state, comprising steps of:
    detecting a primary combustion period on the basis of a first ion current which composes the detected ion current and occurs immediately after ignition;
    detecting a secondary combustion period on the basis of the ion current which occurs after disappearance of the first ion current when at least the detected primary combustion period is normal;
    determining the combustion state on the basis of the detected primary combustion period when the secondary combustion period is smaller than a predetermined value; and
    determining the combustion state on the basis of a whole combustion period from start of the detection period of the ion current to end of the last secondary combustion period in the detection period when the secondary combustion period is larger than the predetermined value.

2. The combustion state determination method of the internal combustion engine according to claim 1, wherein the secondary combustion period is the sum of a plurality of secondary combustion periods.

3. The combustion state determination method of the internal combustion engine according to claim 1, wherein the secondary combustion period is a period from end of the primary combustion period to complete disappearance of the ion current in the ion current detection period.

4. The combustion state determination method of the internal combustion engine according to claim 1, wherein a determination upper limit and a determination lower limit are set and when the detected primary combustion period falls within a range defined by the determination lower limit and the determination upper limit, the detected primary combustion period is determined as normal.

5. The combustion state determination method of the internal combustion engine according to claim 1, wherein the combustion state is determined on the basis of length of a determination combustion period.

6. The combustion state determination method of the internal combustion engine according to claim 1, wherein the combustion state is determined on the basis of a rate of variability of a determination combustion period.

* * * * *

UNITED STATES PATENT AND TRADEMARK OFFICE
CERTIFICATE OF CORRECTION

| | |
|---|---|
| PATENT NO. | : 7,448,253 B2 |
| APPLICATION NO. | : 11/659663 |
| DATED | : November 11, 2008 |
| INVENTOR(S) | : Asano et al. |

It is certified that error appears in the above-identified patent and that said Letters Patent is hereby corrected as shown below:

Title page, illustrative fig. 2 should be deleted and substitute therefore the attached title page consisting of the attached illustrative fig. 2.

In the Drawings

The drawing sheets 2 of 4 and 4 of 4 consisting of Fig(s) 2 and 4 should be deleted and substitute therefore the attached drawing sheets 2 of 4 and 4 of 4 consisting of Fig(s) 2 and 4.

Signed and Sealed this

Twenty-eighth Day of July, 2009

JOHN DOLL
*Acting Director of the United States Patent and Trademark Office*

United States Patent
Asano et al.

(10) Patent No.: US 7,448,253 B2
(45) Date of Patent: Nov. 11, 2008

(54) COMBUSTION STATE DETERMINATION METHOD OF INTERNAL COMBUSTION ENGINE

(75) Inventors: Morita Asano, Ikeda (JP); Mitsuhiro Izumi, Osaka (JP); Tsutomu Kusuhara, Osaka (JP)

(73) Assignees: Daihatsu Motor Co., Ltd. (JP); Diamond Electric Mfg. Co., Ltd. (JP)

( * ) Notice: Subject to any disclaimer, the term of this patent is extended or adjusted under 35 U.S.C. 154(b) by 63 days.

(21) Appl. No.: 11/659,663

(22) PCT Filed: Aug. 3, 2005

(86) PCT No.: PCT/JP2005/014221

§ 371 (c)(1),
(2), (4) Date: Feb. 7, 2007

(87) PCT Pub. No.: WO2006/018975

PCT Pub. Date: Feb. 23, 2006

(65) Prior Publication Data
US 2008/0028842 A1  Feb. 7, 2008

(30) Foreign Application Priority Data
Aug. 20, 2004 (JP) .................. 2004-240996

(51) Int. Cl.
*G01M 15/00* (2006.01)
(52) U.S. Cl. .................. 73/35.08; 73/114.08
(58) Field of Classification Search .............. 73/35.01, 73/35.03, 35.06, 35.07, 35.08, 114.02, 114.08, 73/114.67
See application file for complete search history.

(56) References Cited

U.S. PATENT DOCUMENTS

| | | | |
|---|---|---|---|
| 6,196,054 B1 * | 3/2001 | Okamura et al. | 73/35.08 |
| 6,213,092 B1 | 4/2001 | Hohner et al. | |
| 6,343,500 B1 * | 2/2002 | Kaiogi et al. | 73/35.08 |
| 6,614,230 B2 * | 9/2003 | Raichle et al. | 324/399 |
| 2001/0017055 A1 * | 8/2001 | Raichle et al. | 73/116 |
| 2002/0021120 A1 | 2/2002 | Raichil et al. | |

(Continued)

FOREIGN PATENT DOCUMENTS

JP  06-034491  2/1994

(Continued)

*Primary Examiner*—Eric S McCall
(74) *Attorney, Agent, or Firm*—Banner & Witcoff, Ltd.

(57) ABSTRACT

The present invention is a combustion state determination method of an internal combustion engine for detecting an ion current which is generated in a combustion chamber at combustion of the internal combustion engine in a detection period to determine a combustion state, comprising steps of detecting a primary combustion period on the basis of a first ion current which forms the detected ion current and occurs immediately after ignition, detecting a secondary combustion period on the basis of the ion current which occurs after disappearance of the first ion current when at least the detected primary combustion period is normal, determining the combustion state on the basis of the detected primary combustion period when the secondary combustion period is smaller than a predetermined value, and determining the combustion state on the basis of a whole combustion period from start of the detection period of the ion current to end of the last secondary combustion period in the detection period when the secondary combustion period is larger than the predetermined value.

6 Claims, 4 Drawing Sheets

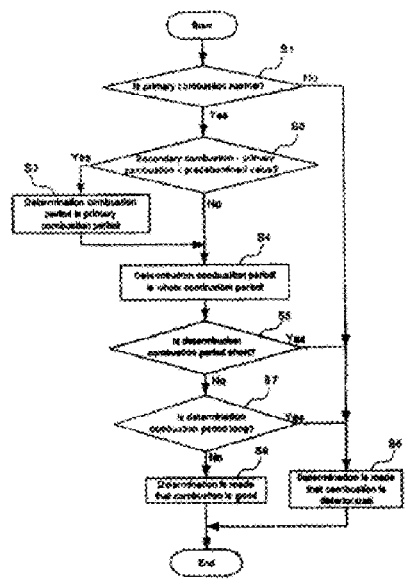

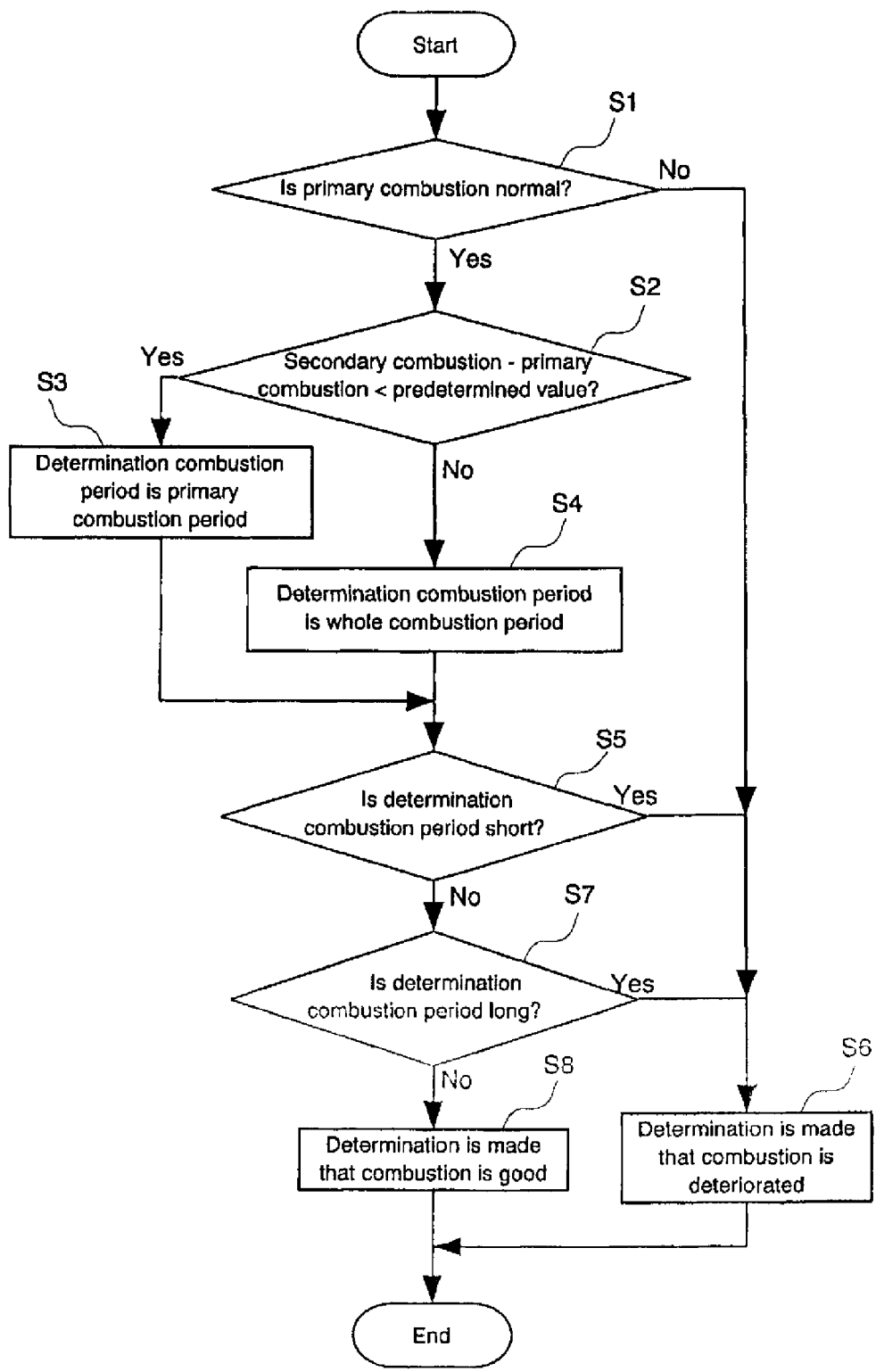

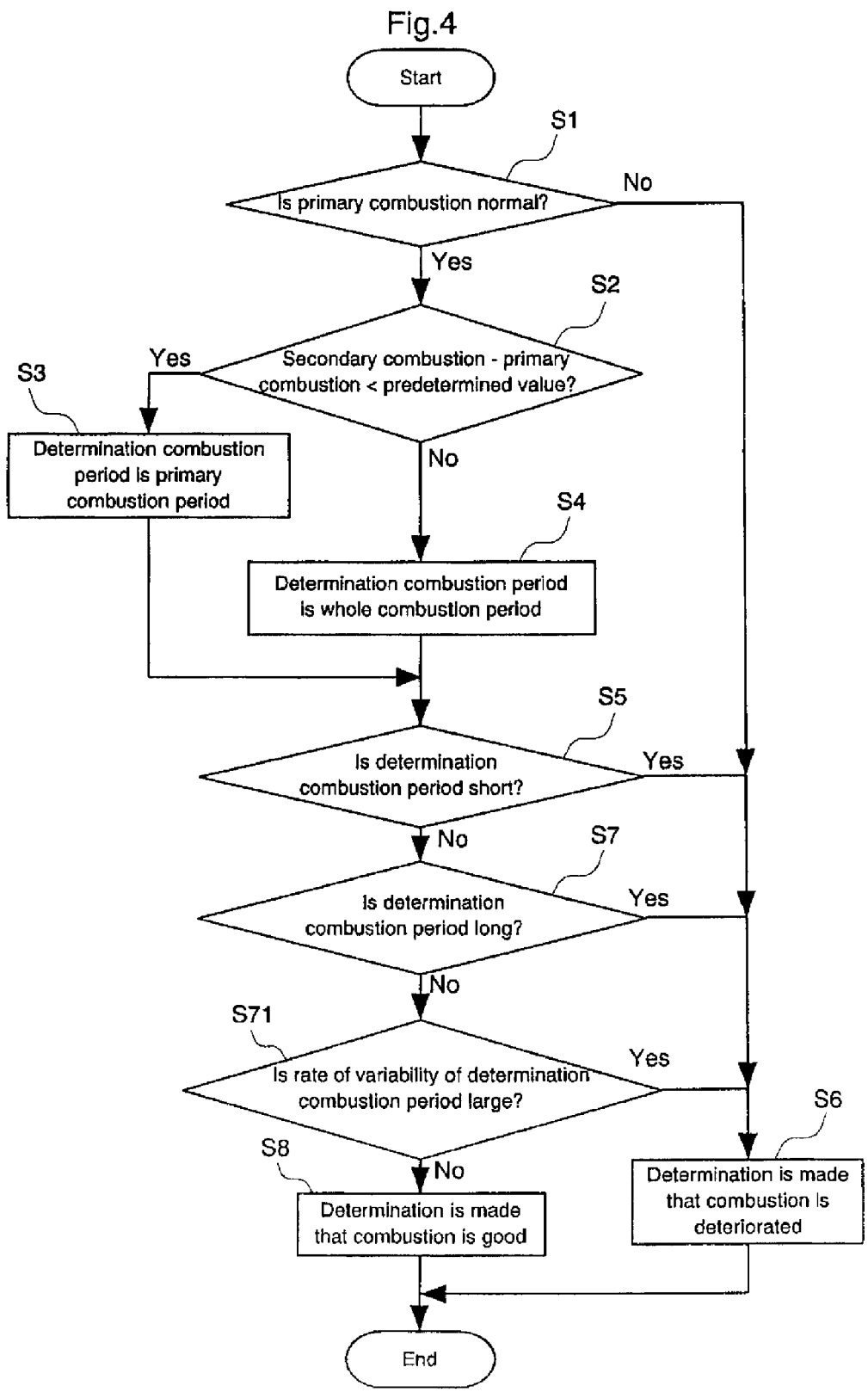

UNITED STATES PATENT AND TRADEMARK OFFICE
CERTIFICATE OF CORRECTION

PATENT NO. : 7,448,253 B2
APPLICATION NO. : 11/659663
DATED : November 11, 2008
INVENTOR(S) : Morito Asano et al.

It is certified that error appears in the above-identified patent and that said Letters Patent is hereby corrected as shown below:

On the Cover Page, Section (75):
    Please delete "Morita Asano, Ikeda (JP)" and insert --Morito Asano, Osaka (JP)--

Signed and Sealed this

First Day of September, 2009

David J. Kappos
*Director of the United States Patent and Trademark Office*